Figure 1:
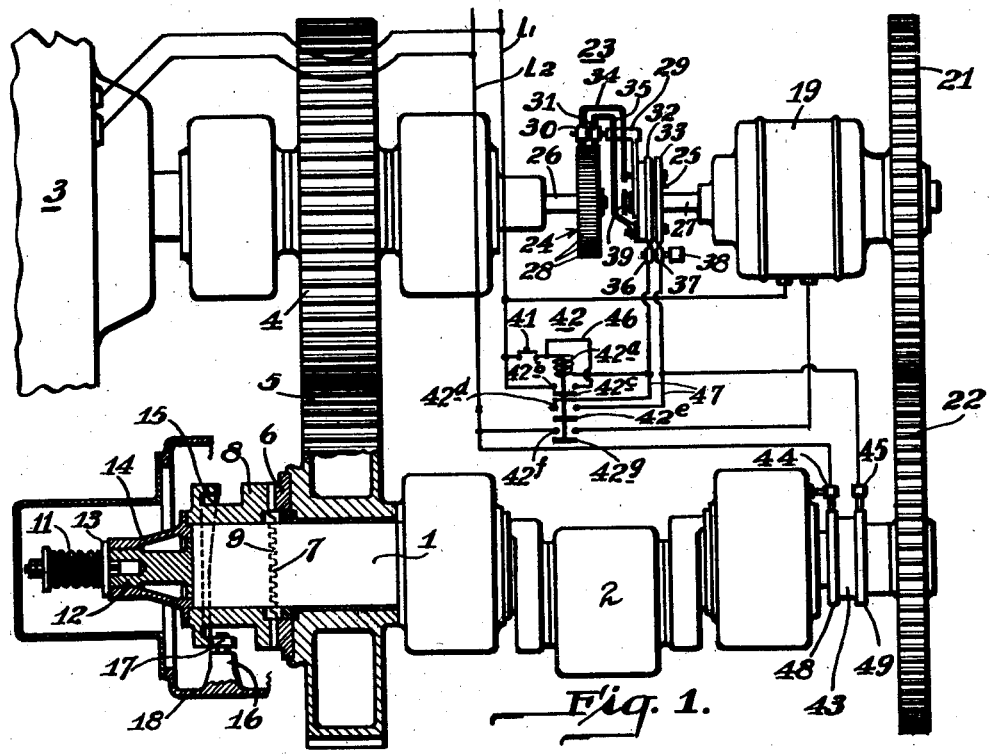

Feb. 28, 1933.    R. H. ELLIS    1,899,677
CONTROL SYSTEM
Filed April 30, 1931

WITNESSES
A. B. Wallace.
J. E. Dickinson.

INVENTOR
Robert H. Ellis
by Brown & Critchlow
his attorneys

Patented Feb. 28, 1933

1,899,677

UNITED STATES PATENT OFFICE

ROBERT H. ELLIS, OF PITTSBURGH, PENNSYLVANIA, ASSIGNOR TO UNITED ENGINEERING & FOUNDRY COMPANY, OF PITTSBURGH, PENNSYLVANIA, A CORPORATION OF PENNSYLVANIA

CONTROL SYSTEM

Application filed April 30, 1931. Serial No. 533,937.

This invention pertains to a motor control, and, although not necessarily so limited, relates more particularly to means for controlling the operation of an auxiliary motor employed in connection with a gear-type clutch mechanism such as is used in intermittently operated machines for setting the driven member of the clutch in motion before the clutch is engaged.

Clutch mechanisms and drives of the type contemplated by this invention are used quite extensively with various forms of intermittently operated heavy duty machines such as punch presses, metal shears and the like. These machines usually have as a part of their operating mechanism a main power shaft which is provided with a crank or eccentric for intermittently reciprocating a head to which a tool is attached. To rotate this main power shaft, a continuously rotated driven clutch member is customarily rotatably mounted upon it, and a driven clutch member keyed to it for rotation and axial movement therewith, the adjacent faces of the clutch members being provided with teeth which engage each other when one of the members is moved against the other to engage the clutch.

In machines of the character referred to the mass of the power shaft and of the movable parts connected to and actuated by it, is usually so great that the force required to set them in motion is not infrequently sufficient to break or injure the teeth of the clutch gears if the clutch is engaged while the shaft is at a standstill, which is the customary method of operating such clutches in accordance with early practice. To overcome this difficulty, a drive has been recently developed in which an auxiliary motor is employed to set the power shaft and its associated parts, including the driven member of a clutch employed in the drive, in motion before the clutch is engaged. The auxiliary motor used for this purpose is adapted to operate intermittently and also to bring the shaft and its associated parts up to the speed of the driving member of the clutch before the clutch is engaged. Such a drive is disclosed in a patent application Serial No. 391,835, for clutch mechanism, filed by John A. Smitmans which issued on June 23, 1931 as Patent No. 1,811,655.

Heretofore no provision has been made in this new drive for insuring the teeth of the clutch gear being in such a position with respect to each other when it is desired to engage the clutch that they will properly mesh with each other. Such a condition presents itself if the faces of the teeth on the two gears are directly opposed to each other when it is attempted to move the two gears together. If this condition occurs, when the speed of the two gears happens to be exactly the same, the clutch cannot be engaged until the relative speeds of the gears are changed sufficiently to permit the teeth to mesh, and, if this does not take place until a load is encountered by the work shaft, serious consequences may result.

With this in view it is the object of this invention primarily to provide mechanism for controlling the auxiliary motor employed in a drive of this character in such a way as to cause the power shaft and the driven gear of the clutch to which it is connected to be brought up to the speed of the driving gear, and the teeth of the driven gear to be brought into proper position with respect to those of the driving gear for the gears to mesh properly by and at the time the gears are moved together, whereby to insure positive and proper engagement of the clutch.

A further object is to provide mechanism for accomplishing this end, which is comparatively simple and sturdy of construction, dependable in operation, and relatively easy to install, and which, in addition, is susceptible of being readily adapted for various other analogous uses.

Figure 2:
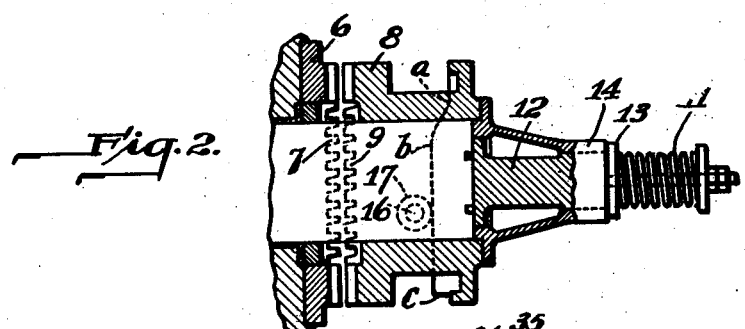
Figure 3:
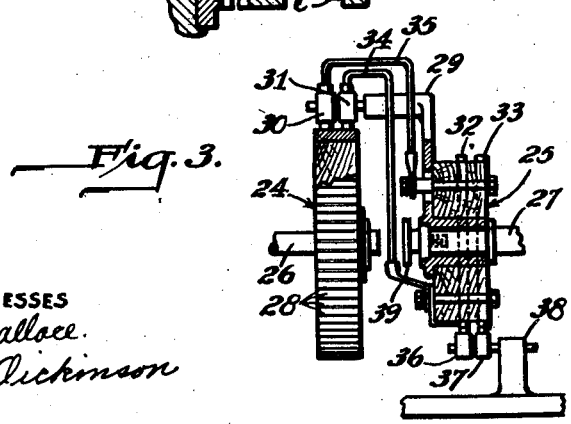

These and other objects, as well as the various other novel features and advantages of the invention, will be apparent when the following detailed description is read in conjunction with the accompanying drawing, in which Fig. 1 is a plan view of a drive embodying the invention, showing a portion of the clutch cut away; Fig. 2 a sectional view on an enlarged scale of the clutch shown in Fig. 1, the section being taken at an angle of 90° to that shown in Fig. 1; and Fig. 3 a vertical section of the synchronizing switch shown in Fig. 1.

Referring to the drawing, a drive of the character contemplated by the invention is illustrated as comprising a power shaft 1, which, for the purpose of explanation, may be considered as the power shaft of a heavy duty metal shear, or any other similar intermittently operable machine of that type. Upon this shaft there is provided the usual eccentric 2 to which the working parts, not shown, of the machine, are connected for reciprocatory or oscillatory movement. For operating the machine employing the drive, a source of power is provided by a motor 3, which, in normal operation, is operated continuously. This motor, as shown, is equipped with a driving gear 4 which is arranged to mesh with a gear 5 rotatably mounted on shaft 1, although any other suitable driving connection between the motor and the machine may be employed.

Between gear 5 and shaft 1 there is arranged a clutch mechanism for intermittently connecting the motor to the shaft, consisting of a vertically disposed gear 6 formed with teeth 7 which is secured to the hub of gear 5, and a cooperating gear 8 provided with teeth 9 which is keyed to shaft 1 in such a way as to permit its being moved into and out of engagement with gear 6. For normally urging gear 8 into engagement with gear 6, a spring 11 is mounted an a projection 12 attached to the end of shaft 1, the inner end of the spring being arranged to bear against a ring 13 that is in turn arranged to engage the outer end of a hollow bracket 14 mounted on the hub of gear 6 about projection 12. For disengaging the clutch, a cam 15 is formed on the hub of gear 8, and is adapted to cooperate with a pin 16 which is rigidly mounted on a housing 18 surrounding the clutch. This pin is adapted to ride on the surface of the cam and force gear 8 away from gear 6 against the force of spring 11 as the cam passes over the pin. To reduce the wear between the pin and cam, an anti-friction roller 17 is mounted on the outer end of the pin.

In this drive, contrary to the prior practice, cam 15, instead of pin 16, is moved to effect the engagement and disengagement of the clutch, as will appear more clearly hereinafter, and, as illustrated more particularly in Fig. 2, the face of the cam is so developed that when point $a$ on the cam engages roller 17 movement of gear 8 away from gear 6 is initiated, the operation thereof being completed by the time point $b$ on the cam reaches roller 17. Thereafter, gear 8 is held in its disengaged position while the cam and shaft 1 continue to rotate until point $c$ on the cam passes roller 17, the distance between points $b$ and $c$ being varied in accordance with the requirements of different drives. At point $c$ the cam drops off sharply and permits spring 11 to move gear 8 quickly into engagement with gear 6 as that point of the cam passes pin 16, the clutch thereafter remaining engaged until point $a$ on the cam is once more carried by roller 17.

For setting shaft 1 in motion and bringing it and its associated parts, including gear 8, up to the speed of the continuously driven gears 5 and 6 before the clutch is engaged, an auxiliary motor 19 is employed. The purpose of this motor, as set forth above, is merely to free the clutch and drive of the shocks customarily imposed upon such connections when the driving gear of the clutch is made to engage the driven gear while the latter is standing still, as has been the case in accordance with the older methods of operating such clutches. Consequently it is not intended to carry any of the work load of the machine with which the clutch is employed, and as the load on it is always substantially the same it always accelerates at substantially a constant rate when started. In machines of the nature contemplated the work load is engaged by shaft 1 only during a very small portion of the movement of eccentric 2, such, for example, as in the case of a metal shear when a piece of stock is being severed by the shear blades. Between the time motor 19 is started and shaft 1 engaged, the motor is given adequate time to perform its functions and need be only sufficiently large to bring the shaft and its associated parts up to the speed of the driving gear of the clutch before the clutch is engaged. In the drive shown, this auxiliary motor is coupled to shaft 1 by a gear 21 which is keyed to the shaft of the motor and a gear 22 meshing with gear 21 which is keyed to the end of shaft 1 opposite to that on which the clutch is mounted.

In accordance with this invention, a control is provided for motor 19 whereby it is adapted to so move shaft 1 and gear 8 before the clutch engagement is attempted that it positively insures teeth 9 of the gear 8 meshing properly with teeth 7 of the gear 6 when the two gears are brought together. This control comprises mainly a synchronizing switch 23 which is employed to control the starting of the motor, and which, as illustrated in Fig. 1, and more particularly in Fig. 3, consists chiefly of a rotary bridging member 24 and a rotary brush-supporting member 25. The former of these two members carries about its periphery a plurality of uniformly spaced commutator-like conductor bars 28 which are insulated from each other in the manner of the segments of a motor commutator, and are adapted to cooperate with a pair of brushes 30 and 31 mounted on a support 29 which is adjustably attached to member 25 by a set screw 39. For moving member 24 in synchronism with gear 6 it is secured to an extension 26 on the end of the shaft carrying gear 4, and for moving brushes 30 and 31 in synchronism with gear 8, member 25 is secured to extension 27 on the end of the drive shaft of motor 19.

For connecting the switch in a control circuit, a pair of brushes 36 and 37 secured to a support 38 are employed and arranged to engage a pair of slip rings 32 and 33 mounted on the rotary member 25, which are in turn connected to brushes 30 and 31 by a pair of flexible conductors 34 and 35, respectively. With this construction a circuit is established through the switch each time one of conductor bars 28 engages brushes 30 and 31, and, in accordance with this invention, this is caused to happen whenever the teeth of gear 8 bear a definite relation to those on gear 6. To attain this end bars 28 are provided in such numbers on member 24 as to exactly correspond with the number of teeth on gear 6. That is to say, when element 24 is driven at the same speed as gear 6, as shown here, it will have the same number of bars 28 as the gear has teeth. When driven at a different speed, the number of bars employed is made such that one of them, as in the previous case, will pass a fixed point each time a tooth on gear 6 passes a similar point, or, in other words, in such numbers as to exactly synchronize the movement of the bars with that of the teeth 7. Like the conductor bars on member 24, the brushes 30 and 31 on rotary member 25 are arranged to be driven in exact synchronism with the teeth of gear 8. Consequently, whether gear 8 is moving or standing still a circuit is completed through switch 23 each time teeth 9 bear a preselected relation to teeth 7 of gear 6.

As shown, the switch is connected in a starting circuit for motor 19 and so adjusted by means of set screw 39 that it will cause the motor to be started when the starting circuit is energized at the instant the teeth on gear 8 bear a certain preselected relation to the teeth on gear 6, the selection being such that the two gears will be in proper relation with each other for meshing by the time the driven gear has been moved to the point where the gears are engaged. Such a circuit is illustrated in Fig. 1 as comprising a pair of current supplying conductors $L_1$ and $L_2$ to which motor 3 is also connected. This starting circuit is traced from supply conductor $L_1$ through a normally open starting push button 41, the actuating coil 42a of a multiple contact type magnetic switch 42, switch 23, and a limit switch 43 to be presently described which is mounted on the end of shaft 1, and thence to supply conductor $L_2$. With this circuit, when switch 41 is closed switch 42 will be energized and closed as soon as one of the bridging members 28 on switch 23 engages brushes 30 and 31 of that switch, and, as illustrated, when switch 42 closes, a power circuit is established for motor 19 which extends from conductor $L_1$ through the motor and thence through contacts 42f by way of bridging member 42g to line conductor $L_2$, although any other circuit controlled by switch 42 may be employed for this purpose.

To permit switch 41 to be released as soon as switch 42 is closed, a holding circuit for coil 42a is provided which comprises a conductor 46 that is connected through a pair of contacts 42b and a bridging member 42c on switch 42 in a manner to shunt switch 41 when established. A similar circuit is also provided for shunting switch 23 as soon as switch 42 is closed, so that switch 42 cannot be deenergized by the bars 28 which initially established the actuating circuit due to its passing out of engagement with brushes 30 and 31 as it does when motor 19 is first started. This latter circuit comprises a conductor 47 which is connected across brushes 36 and 37 in circuit relation with a pair of contacts 42d on switch 42 which are closed by bridging member 42e when switch 42 is closed. Accordingly, motor 19 is started with the teeth of gear 8 bearing a definite relation to those of teeth 6 each time starting push button 41 is closed, and after being started the push button may be released and the motor will continue to operate until switch 43 breaks the holding circuit for coil 42a.

The purpose of switch 43 is to automatically open the circuit of motor 19 as soon as the clutch is engaged, and, as shown, it comprises a pair of segmental conductor bands 48 and 49 which are mounted for rotation with shaft 1 and a pair of brushes 44 and 45 held in place by a support 49, which are arranged to ride upon bands 48 and 49 in the customary manner. To provide for automatically opening the motor circuit as the clutch is engaged, bands 48 and 49 are designed to pass from under brushes 44 and 45 at about the instant point c of cam 15 passes pin 16, and, to provide for restarting motor 19, they are adapted to reengage brushes 44 and 45 sufficiently before shaft 1 comes to a stop to insure such engagement under all conditions of operation.

When motor 19 is deenergized, which, as stated above, occurs after the clutch is engaged, or at substantially the same instant, it functions as a load upon shaft 1, and, in doing so, causes gear 8 to be held firmly against gear 6 so that no shock is imparted to the drive due to slack in the driving connection when the tool coupled to eccentric 2 engages the work. To increase this braking action of the motor, as well as to insure shaft 1 being stopped in exactly the same position after each operation, switch 43, as will be readily understood by those skilled in the art, may be adapted to set up a dynamic braking circuit in the motor at the instant the clutch is disengaged, or to operate a positive stopping device of any suitable kind for shaft 1.

In the operation of the drive illustrated, motor 3 is first started and permitted to operate continuously in the usual manner. Thereafter, whenever it is desired to actuate shaft 1, push button 41 is closed, the operation of which may be effected manually, or by any suitable automatic means not illustrated. This switch in closing renders switch 23 active, whereby a circuit through coils 42a of switch 42 and limit switch 43 is established as soon as one of the conductor bars 28 on switch 23 engages brushes 30 and 31. Such connection occurs when the switch is properly adjusted at the instant the teeth on gear 8 bear such a relation to those on gear 6 that motor 19, which is started with the closing of switch 42, will actuate shaft 1 and gear 8 so as to bring the gear in proper meshing relation with gear 6 by the time point $c$ of cam 15 passes pin 16. With the closing of switch 42 and the starting of motor 19, switches 41 and 23 are shunted whereafter motor 19 continues in operation until its circuit is broken by switch 43, which occurs at substantially the instant point $c$ on cam 15 passes pin 16 and the clutch is engaged. As mentioned above, at this instant the gear 8 is moving at substantially the same speed as gear 6 and the teeth of the two gears are in proper position to permit their being positively engaged when moved together by spring 11.

After the clutch is engaged, shaft 1 is driven by motor 3 until point $b$ on cam 15 passes pin 16. At substantially the instant of, or slightly after, the clutch engagement is effected, conductor bands 48 and 49 of limit switch 43 pass out of engagement with brushes 44 and 45, causing switch 42 to be deenergized and to fall open. This breaks the operating circuit of motor 19, which, when deenergized, causes the motor to impose a small load on shaft 1, the effect of which is to insure contact between the teeth of the clutch gears so that there is no play in the clutch when the work is engaged by shaft 1. As soon as the tool coupled to eccentric 2 has passed through its work cycle, point $a$ of cam 15 engages pin 16, initiating the disengagement of the clutch which is completed when point $b$ of the cam passes roller 17. Thereafter shaft 1 comes to rest in readiness for a repetition of the cycle of operation.

In accordance with the foregoing, it will be readily appreciated that while this invention as illustrated and described appears to have its greatest application in connection with the operation of clutches employed in the drives of intermittently operated heavy duty machines of the type referred to, it may be also used to advantage in connection with various other mechanical movements where similar requirements of operation are desired. Also, it may be embodied in various other forms of apparatus than that shown without departing from the spirit of the invention as set forth in the appended claims.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim as my invention:

1. The combination with a clutch mechanism comprising a continuously actuated driving member, a normally stationary driven member, and a motor operably coupled to said driven member for imparting rotation thereto; of a control for said motor comprising a starting circuit having a switch connected therein which is adapted when energized to complete said starting circuit when the driving and driven members of the clutch mechanism bear a substantially definite preselected relation to one another.

2. The combination with a clutch mechanism comprising a continuously rotated driving gear, a normally stationary driven gear arranged to cooperate with said driving gear, and a motor for rotating said latter gear; of a control for said motor comprising a starting circuit therefor having connected therein a switch which is adapted when the circuit is energized to effect the starting of the motor when the teeth on said clutch gears bear a substantialy definite preselected angular relation to each other.

3. The combination with a clutch mechanism comprising a continuously rotated driving gear, a normally stationary driven gear, means for moving one of said gears into engagement with the other, means for disengaging the gears, a motor for rotating said driven gear in the direction of rotation of said driving gear, and means actuated with said driven gear for governing the engagement and disengagement of said gears; of a control for said motor comprising a source of current supply, a starting circuit for the motor connected to said current supply, a synchronizing switch included in said circuit which is adapted to complete a circuit through itself when the teeth on said clutch gears bear a preselected angular relation to one another, and a starting switch for completing the starting circuit to said synchronizing switch when it is desired to engage the clutch.

4. The combination with a clutch mechanism comprising a continuously rotated driving gear, a normally stationary driven gear, means for moving one of said gears into engagement with the other, means for disengaging said gears, a motor for rotating said driven gear in the direction of rotation of said driving gear, and means actuated with said driven gear for governing the engagement and disengagement of said gears; of a control system for said motor comprising a source of current supply, a starting circuit consisting of a synchronizing switch actuated in synchronism with said gears and adapted to complete a circuit through itself only when the teeth on said gears bear a preselected relation to each other, and a starting switch connected in series circuit relation with said synchronizing switch for energizing said latter switch when it is desired to engage the clutch.

5. The combination with a clutch mechanism comprising a continuously rotated driving gear, a normally stationary driven gear, means for moving one of said gears into engagement with the other, means for disengaging said gears, a motor for rotating said driven gear in the direction of rotation of said driving gear, and means actuated with said driven gear for governing the engagement and disengagement of said gears; of a control system for said motor comprising a source of current supply, a starting circuit consisting of a synchronizing switch actuated in synchronism with said gears and adapted to complete a circuit through itself only when the teeth on said gears bear a preselected relation to each other, a starting switch connected in series circuit relation with said synchronizing switch for energizing said latter switch when it is desired to engage the clutch, and a limit switch actuated with the means employed to govern the engagement and disengagement of the clutch connected in series with said other switches and adapted to break said circuit at a given point in its cycle of operation.

6. The combination with a clutch mechanism comprising a continuously rotated driving member, a cooperating normally stationary driven member, and a motor for rotating said driven clutch member in the direction of said continuously rotated driving member; of a control system for said motor comprising a source of current supply, and a starting circuit including means for starting said motor connected to said current supply and in addition a starting switch and a synchronizing switch connected in series with said motor starting means, said synchronizing switch comprising a bridging member connected to rotate with said driving clutch member and a brush supporting member carrying a pair of brushes arranged to engage said bridging member and mounted for rotation with said driven clutch member, said bridging member being constructed to complete the circuit through said brushes only when said clutch members bear a preselected angular relation with one another.

7. The combination with a clutch mechanism comprising a continuously rotated driving member, a cooperating normally stationary driven member, and a motor for rotating said driven clutch member in the direction of said continuously rotated driving member; of a control system for said motor comprising a source of current supply, and a starting circuit including means for starting said motor connected to said current supply and in addition a starting switch and a synchronizing switch connected in series with said motor starting means, said synchronizing switch comprising a bridging member connected to rotate with said driving clutch member, and a brush supporting member carrying a pair of brushes arranged to engage said bridging member and mounted for rotation with said driven clutch member, said bridging member being constructed to complete the circuit through said brushes only when said clutch members bear a preselected angular relation with one another, and means for adjusting the angular relation of one of said switch members with respect to the member it is connected to rotate with whereby to vary the position at which the switch will complete the circuit through said brushes with respect to the angular relationship of the clutch members.

8. The combination of a clutch mechanism comprising a continuously rotated driving member, a normally stationary driven member and a motor for rotating said driven member in the direction of rotation of said driving member, a control system for said motor comprising a source of current supply, and a starting circuit for said motor connected to said current supply, said circuit including a starting switch and a synchronizing switch connected in series circuit relation with means for starting the motor, said synchronizing switch being constructed to complete the circuit through itself when the driving and driven members of the clutch bear a preselected angular relation with each other and to include means for adjusting it to vary the starting of the motor with respect to the relative angular positions of said clutch members.

In testimony whereof, I sign my name.

ROBERT H. ELLIS.